United States Patent [19]

Mason et al.

[11] Patent Number: 4,521,366
[45] Date of Patent: Jun. 4, 1985

[54] METHOD FOR CLOSING AND SEALING PLASTIC TUBING USING A HOT DIE AND A ROTATING COLD DIE

[75] Inventors: Joe Mason, Mundelein; Hermann F. Eckert, Palatine, both of Ill.

[73] Assignee: Baxter Travenol Laboratories, Inc., Deerfield, Ill.

[21] Appl. No.: 392,421

[22] Filed: Jun. 24, 1982

[51] Int. Cl.³ .............................................. B29C 17/00
[52] U.S. Cl. .................................. 264/312; 264/310; 425/384; 604/408
[58] Field of Search ................. 264/310, 312; 425/384

[56] References Cited

U.S. PATENT DOCUMENTS

| | | | |
|---|---|---|---|
| 2,169,315 | 8/1939 | Yngve | 18/55 |
| 2,413,449 | 12/1946 | Hatch | 93/55.1 |
| 2,419,864 | 4/1947 | Westin | 264/310 |
| 2,705,346 | 4/1955 | Schlabach | 264/310 |
| 3,045,287 | 7/1962 | Yost et al. | 18/55 |
| 3,288,898 | 11/1966 | West | 264/98 |
| 3,905,368 | 9/1975 | Lewis, Jr. et al. | 128/272 |
| 3,949,033 | 4/1976 | Uhlig | 264/312 |
| 3,978,859 | 9/1976 | Goodenough et al. | 128/272 |
| 4,111,324 | 9/1978 | Winchell | 215/232 |
| 4,127,208 | 11/1978 | Fowles et al. | 215/253 |
| 4,288,478 | 9/1981 | Kinoshita et al. | 428/35 |

FOREIGN PATENT DOCUMENTS 2042664 9/1980 United Kingdom ................ 264/310

OTHER PUBLICATIONS

Defensive Publication T913,002, *Friction-Welded Bottom Seals on Thermoplastic Bottles*, to Carmichael, Published Aug. 14, 1973.

*Primary Examiner*—James Derrington
*Attorney, Agent, or Firm*—Thomas A. Kmiotek; Daniel D. Ryan; Bradford R. L. Price

[57] ABSTRACT

Container bags for intravenous solution of one-piece, blow-molded construction typically have a fill port or tube and at least an administration port in one end of the container bag. A method, an apparatus and an article of manufacture are provided where a fill port or tube on a polyolefin or other plastic container bag is sealed into a dome shape where the solid wall, dome-shaped material closing the port or tube effects the seal. The method provides for sealing the open end of a thermoplastic tube or port by using respectively hot and cold dies. Resistance of the tube or port to forming a seal at adjoining interfaces is overcome by rotating at least one of the dies. Disruption and mixing of the plastic at the interface or closure line is accomplished, forming a substantially homogenous mass which seals the port opening.

3 Claims, 8 Drawing Figures

METHOD FOR CLOSING AND SEALING PLASTIC TUBING USING A HOT DIE AND A ROTATING COLD DIE

FIELD OF THE INVENTION

The invention relates generally to a seal or closure for container openings or ports, tubing, pipes, or hoses. It particularly relates to a seal or closure for ports or tubes on intravenous (IV) solution container bags which are used for storing and dispensing medical fluids. Such container bags typically have an injection site port and an administration port (both covered by port protectors) in one end of the container bag with a fill port located in between. A depending tab, integral with the container bag, is located on the end opposite the ports and defines a hanger opening.

BACKGROUND OF THE INVENTION

Container bags having an injection site port, an administration port and a fill port opening in one end and with a depending tab having a hanger opening therein on the other end are known in the art. Generally, container bags are filled with a sterile fluid, for example, a dextrose solution or saline solution or one of a myriad of other medical fluids. The injection site port allows addition of a medicament to the medical fluid. Fluids in the container bag may be delivered to the patient through an administration set having a spike or cannula at one end which is inserted into the administration port of the container bag. Prior to use of the container bag, both the injection site port and the administration port are usually covered by a thermoplastic port protector or closure which defines a frangible section at the port site.

Usually, in the manufacture of such container bags, an injection site port and an administration port are attached to a container bag at their respective port openings followed by a sterile filling of the container bag through a fill port opening. Once the required volume of fluid is in the container bag, the fill port opening is sealed. Port protectors may be attached to the injection site port and the administration port either before or after sealing of the fill port.

Use of container bags made of polyvinyl chloride (PVC) is widespread in the medical field. However, plastic materials with a water vapor permeability lower than PVC have been used as substitutes. With rapid advancements in plastic blow molding technology, blow-molded, polyolefin containers have become cost competitive with PVC containers while at the same time providing materials that are highly impermeable to water vapor.

Sealing of the PVC fill port openings on PVC bags is generally accomplished by pinching off and heat sealing the open end. Polyolefin bags, however, are sealed with a heat, pinch-sealing method only with difficulty. The inner wall of a polyolefin fill port tube, when pinched together, does not readily fuse together when heat is applied to form a strong closure line. The closure line must be physically disrupted and the plastic at the interface mixed, if the highest quality seal is to be effected.

BRIEF SUMMARY OF THE INVENTION

The present invention overcomes the drawbacks of the prior art by providing a method and apparatus for reliably sealing fill ports or any other tube, pipe or hose made of polyolefin or other thermoplastic. The sealed fill port comprises a sealed wall portion of dome shape.

A typical container bag of this invention is made with an injection site port, a fill port opening and an administration port. The fill port opening may be located between the injection site port and the administration port, or elsewhere as desired. Filling of the container bag proceeds at the fill port, followed by sealing the fill port opening.

The method of this invention provides for sealing the open end of a thermoplastic tube or port by using respectively hot and cold dies, and rotating at least one of those dies. The method comprises inserting the open end of the port into a hot die having a cavity with a curved inner end defining a generally paraboloid shape. The heat softens the plastic port and at least closes the open end by bringing the halves of the inner wall into contact to form the generally paraboloid shape. At this point, the plastic port may or may not have an impervious seal.

The heat-softened, closed port is then removed and inserted into the cavity of a preferably rotating cold die, which disrupts and mixes the plastic at the interface or closure line to effect a seal, to cool the tube or port, to help shape the port, and to prevent excessive slumping during the cooling. Resistance of the tube or port to forming a seal at adjoining interfaces or halves of the inner wall is overcome by rotating at least one of the dies, preferably the cold die. In this manner, a substantially homogeneous dome-shaped mass is formed which seals the port opening.

A distinction is made between closing the fill port and sealing the fill port because of the resistance of the polyolefin tube end to fusing or mixing together. Closing of the fill port causes the inner wall portions to be united or brought into contact, forming a closure line. However, fusing or mixing of the inner wall halves at the closure line may not completely take place until after treatment with the second, cold die. The result is an impervious wall or slug of material that does not have a closure line that can leak.

The apparatus of this invention for sealing the open end of the plastic port comprises a hot die having a cavity with a curved inner end, means for inserting the plastic port into the cavity of the hot die, a cold die with a cavity proportioned to shape the port and to prevent excessive slumping of the port, means for inserting the port into the cold die, and means for rotating at least one of the dies to perfect the seal formed on the end of the port.

The term "hot die" implies an operating temperature above the softening point of the plastic being sealed. The term "cold die" implies an operating temperature below such softening point, typically about room temperature.

BRIEF DESCRIPTION OF THE DRAWINGS

For a more complete understanding of this invention reference should now be had to the embodiment illustrated in greater detail in the accompanying drawings.

In the drawings.

DESCRIPTION OF THE PREFERRED EMBODIMENTS

Figure 1:
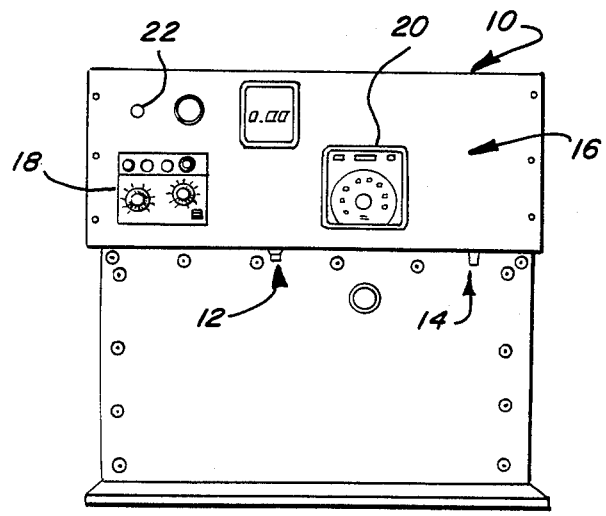
FIG. 1 is an elevational view of the apparatus of this invention.

Turning now to the drawings, FIG. 1 shows a prototype apparatus 10 used for sealing fill tubes or ports on plastic containers. Cold die 12 and hot die 14 are shown on apparatus 10, hot die 14 being heated in use by included conventional electric heating means or the like. Cold die 12 may be cooled conventionally such as by connection to a mass of metal serving as a heat sink, or water cooled. Front panel 16 of apparatus 10 has mounted thereon motor speed control 18 used to control the speed of a rotating die, temperature control and indicator 20, used to control the temperature of the hot die, and power on/off switch 22.

Figure 3:
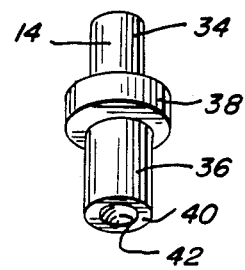
FIG. 3 is a perspective view of a hot die used in the apparatus.

Hot die 14 is shown in FIG. 3 having first cylindrical section 34 and second cylindrical section 36 having a larger diameter than first cylindrical section 34. Third cylindrical section 38 with a diameter larger than cylindrical section 36 separates first and second cylindrical sections 34, 36. Cylindrical section 36 has face 40 with a cavity 42 therein, for receiving a tube for heating, softening and closing.

Figure 2:
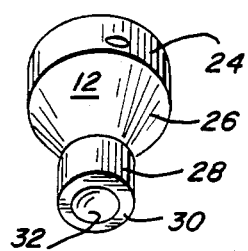
FIG. 2 is a perspective view of a cold die used in the apparatus.

Referring to FIG. 2, cold die 12 is shown having first cylindrical section 24 which, at conical section 26, tapers to smaller, second cylindrical section 28. In face 30 of cold die 12 is cavity 32, for sealing, cooling and supporting the hot, closed tube.

Cold die 12 and hot die 14 illustrated in FIGS. 2 and 3 are particularly preferred embodiments. However, the unique features of this invention may also be achieved by dies having a variety of shapes. Also, in FIGS. 2 and 3, the configurations of cavity 32 in face 30 of cold die 12 and cavity 42 in face 40 of hot die 14 may vary, but the rotating die must define a cavity having an end wall of curved radius for forming a fill port or tube into a solid wall of dome shape. Cavity 32, which is designed to disrupt the closure line during rotation, also provides a supporting, shaping and cooling function. Cavity 32 may also have an anti-adhesive surface, such as a coating of polytetrafluoroethylene. Likewise, the configuration of cavity 42 in hot die 14 (FIG. 3) is designed to close a tube or port and has a shape which functions accordingly. Cavity 42 may also have an anti-adhesive surface for example, polytetrafluoroethylene.

Figure 4:
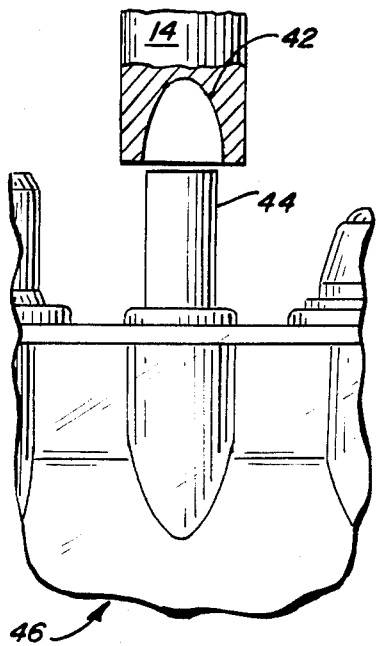
FIG. 4 is an elevational view, taken partly in section, showing a fill port on a container just prior to engagement by the hot die.
Figure 5:
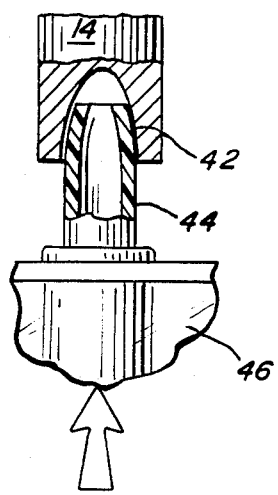
FIG. 5 is an elevational view, taken partly in section, showing the fill port of FIG. 4 being engaged by the hot die to soften and close the open fill port.
Figure 6:
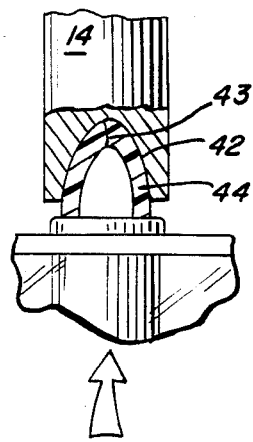
FIG. 6 is an elevational view, taken partly in section, showing the fill port of FIG. 4 being engaged by the hot die after softening and closing the open fill port.

In FIG. 4, hot die 14 is shown immediately prior to engaging a fill port 44 on container 46. The open end of fill port 44 is shown being inserted into generally paraboloid-shaped cavity 42 of hot die 14. In FIG. 5, the walls of fill port 44 are shown being deformed inwardly by cavity 42 after softening by the heat from hot die 14. The curved inner end defined by cavity 42 begins to close the open fill port 44, as tube 44 is inserted further into die 14. The walls of fill port 44 are shown completely closed in FIG. 6. Fill port 44 has assumed a generally paraboloid shape imparted by cavity 42 of hot die 14.

Although fill port 44 has been closed, it may not be completely sealed. A closure line 43 is often still present, and unless the plastic at the closure line 43 is mixed or fused to provide a homogeneous plastic mass, leakage or contamination of the contents is a possibility.

Figure 7:
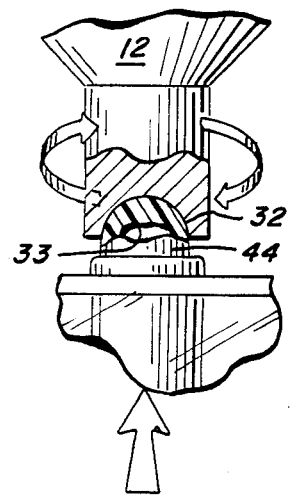
FIG. 7 is an elevational view, taken partly in section, showing the fill port of FIG. 6 being engaged by a rotating cold die to seal, shape and cool the fill port.

FIG. 7 shows fill port 44 after having been removed from hot die 14 and inserted into cavity 32 of cold die 12 before tube 44 cools. Rotating cold die 12 functions to physically disrupt the interface or closure line 43 of the inner diameters of plastic fill port 44 interfusing the interface to form a dome-shaped, sealed port having a solid wall 33. Cavity 32 also prevents excessive slumping of softened, sealed fill port 44 as well as cooling the hot fill port 44.

The dome shape for the cold die 12 is preferred but, when cold die 14 performs a cooling and support function only—neither rotating nor functioning to disrupt the closure line defined by the inner wall of the fill port tube—cavity 32 need not have a radius or be dome-shaped.

Preferably, cavity 32 is of more spherical shape than generally paraboloidal cavity 42, to facilitate the disruption of closure line 43 as die 12 rotates.

Various alternative embodiments of the methods of this invention include a rotating hot die and a rotationally stationary cold die. The disruption and interfusion of the fill port interface or closure line is then primarily accomplished by the rotating hot die. The hot die would have a cavity suitably shaped for closing, physically disrupting the seal line, and sealing the tube or fill port. Preferably the cavity would be dome or paraboloid shaped. The cold die would perform shaping, cooling and support functions.

Similarly, both the hot die and the cold die may be rotating, in which instance, cavities in both dies would typically be curved dome shapes. The sealed fill port would be withdrawn from the cold die when the port has substantially hardened. The result is a sealed, dome-shaped, fill port having a solid wall or slug of material effecting the seal.

The temperature of the hot die of this invention is preferably in the range of 400° F. to 500° F., well above the plastic softening point, while the temperature of the cold die is typically within the range of 50° F. to 150° F. The method of this invention is particularly well suited for sealing plastic ports made of a polyolefin.

Figure 8:
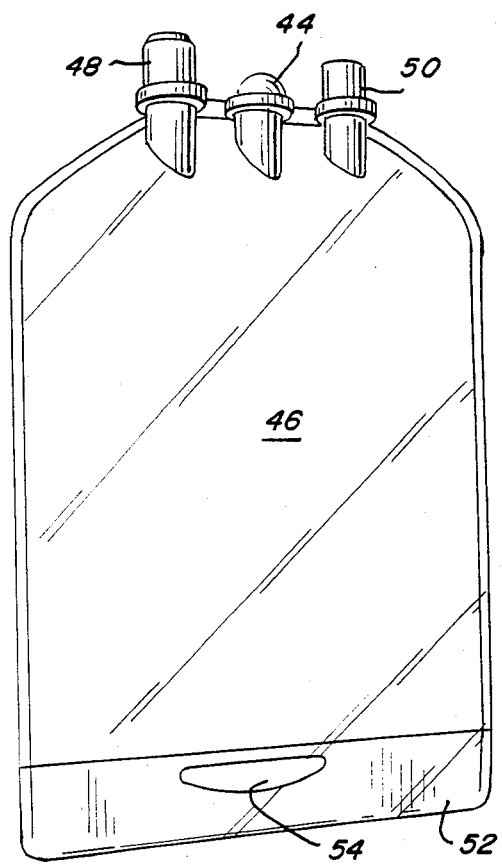
FIG. 8 is a perspective view of a plastic container illustrating a dome shaped, sealed fill port formed in accordance with this invention.

Now turning to FIG. 8, flexible plastic container 46 is shown having a sealed, dome-shaped fill port 44. Administration port 48 and injection site port 50 are shown on container 46, being closed by port protectors. Depending integral tab 52 is located on the end opposite the ports and defines hanger opening 54.

The above has been offered for illustrative purposes, and is not intended to limit the invention of this application, which is defined in the claims below.

What is claimed is:

1. A method for sealing the open end of a plastic tube comprising the steps of:
   inserting the open end of the tube into the cavity of a hot die to heat and soften the plastic while simultaneously deforming the tube walls inwardly until the walls join along a closure line, thereby forming a closed tube end;

withdrawing the heated, softened closed tube end from the hot die;

inserting the heated, softened closed tube end into the cavity of a cold die to cool the closed tube end;

while the closed tube end is being cooled, rotating the cold die about the closed tube end to disrupt the closure line and interfuse the joined tube walls along the closure line to form a homogeneous plastic mass sealing the closed tube end; and withdrawing the closed and sealed tube end from the cold die when the closed and sealed tube end has substantially hardened.

2. A method according to claim 1, wherein the temperature of the hot die is within the range of 400° F. to 500° F., and the temperature of the cold die is within the range of 50° F. to 150° F.

3. A method according to claim 1 or 2, wherein the plastic tube is made of a polyolefin.

* * * * *